(12) United States Patent
MacWilliams et al.

(10) Patent No.: US 6,209,072 B1
(45) Date of Patent: Mar. 27, 2001

(54) SOURCE SYNCHRONOUS INTERFACE BETWEEN MASTER AND SLAVE USING A DESKEW LATCH

(75) Inventors: Peter MacWilliams, Aloha, OR (US); Bindi Prasad, Los Altos, CA (US); Manoji Khare; Dilip Sampath, both of Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/852,438

(22) Filed: May 6, 1997

(51) Int. Cl.[7] .............................. G06F 13/00; G06F 13/14
(52) U.S. Cl. ...................... 711/167; 714/700; 713/400; 713/401; 713/503; 711/118
(58) Field of Search .................................... 711/167, 118; 395/552, 551, 558; 365/233; 714/700; 713/400, 401, 503

(56) References Cited

U.S. PATENT DOCUMENTS

| | | |
|---|---|---|
| 3,766,532 | 10/1973 | Liebel, Jr. . |
| 4,141,067 | 2/1979 | McLagen . |
| 4,323,967 | 4/1982 | Peters et al. . |
| 4,342,069 | 7/1982 | Link . |
| 4,755,930 | 7/1988 | Wilson, Jr. et al. . |
| 4,965,793 | * 10/1990 | Polzin et al. .......................... 370/236 |

(List continued on next page.)

OTHER PUBLICATIONS

Intel, "82430FX PCIset Datasheet 82437FX System Controller (TSC) and 82438FX Data Path Unit (TDP)", pp 1–39, Docu Order No. 290518–002, Nov. 1996.*

Micron Technology Inc., 1997 DRAM Data Book, pp 7–225 thru 7–247, 1997.*

Micron Technology Inc., "1997 DRAM Data Book" pp 9–81 thru 9–91 and 5–1 thru 5–15, Mar. 1997.*

Baer, et al., "On the Inclusion Properties for Multi–level Cache Hierarchies," 1988, pp. 73–80.

Popescu, et al., "The Metaflow Architecture", IEEE Micro, Jun. 1991, pp. 10–13 and 63–73.

Uchiyama, et al., "Design of a Second–Level Cache Chip for Shared–Bus Multimicroprocessor Systems," IEEE 1991, pp. 566–571.

IEEE Standard for Low–voltage Differential Signals (LVDS) for Scalable Coherent Interface (SCI), IEEE Std. 1596.3–1996, Jul. 31, 1996, pp. 1–30.

* cited by examiner

Primary Examiner—Do Hyun Yoo
Assistant Examiner—Hong Kim
(74) Attorney, Agent, or Firm—Blakely, Sokoloff, Taylor & Zafman LLP

(57) ABSTRACT

A source synchronous interface between a master device and slave device is described. A master device having a plurality of deskew latches is coupled to a slave device via a bus. The master device communicates commands and first timing information to the slave device via the bus. In response, the slave device communicates data and second timing information to the master device via the bus. When data is communicated from the slave device to the master device, the data is stored in one of the plurality of deskew latches until accessed by the master device. The plurality of deskew latches ensure that the master device will always read valid data for the full range of skew of the first and second timing information.

11 Claims, 6 Drawing Sheets

U.S. PATENT DOCUMENTS

| | | |
|---|---|---|
| 4,969,122 | 11/1990 | Jensen . |
| 5,025,366 | 6/1991 | Baror . |
| 5,058,006 | 10/1991 | Durdan et al. . |
| 5,136,700 | 8/1992 | Thacker . |
| 5,155,067 | 10/1992 | Wood et al. . |
| 5,193,163 | 3/1993 | Sanders et al. . |
| 5,249,282 | 9/1993 | Segers . |
| 5,251,308 | 10/1993 | Frank et al. . |
| 5,265,235 | 11/1993 | Sindhu et al. . |
| 5,287,484 | 2/1994 | Nishii et al. . |
| 5,297,269 | 3/1994 | Donaldson et al. . |
| 5,303,362 | 4/1994 | Butts, Jr. et al. . |
| 5,317,716 | 5/1994 | Liu . |
| 5,319,766 | 6/1994 | Thaller et al. . |
| 5,325,503 | 6/1994 | Stevens et al. . |
| 5,325,504 | 6/1994 | Tipley et al. . |
| 5,345,576 | 9/1994 | Lee et al. . |
| 5,353,424 | 10/1994 | Partovi et al. . |
| 5,361,267 | 11/1994 | Godiwala et al. . |
| 5,369,753 | 11/1994 | Tipley . |
| 5,388,224 | 2/1995 | Maskas . |
| 5,390,311 | 2/1995 | Fu et al. . |
| 5,414,828 | 5/1995 | Yarkoni et al. . |
| 5,432,823 * | 7/1995 | Gasbarro et al. ............... 375/356 |
| 5,434,993 | 7/1995 | Liencres et al. . |
| 5,446,863 | 8/1995 | Stevens et al. . |
| 5,454,088 | 9/1995 | Nakagawa . |
| 5,454,093 | 9/1995 | Abdulhafiz et al. . |
| 5,488,639 * | 1/1996 | MacWilliams et al. ............ 375/355 |
| 5,524,233 | 6/1996 | Milburn et al. . |
| 5,678,020 | 10/1997 | Singh et al. . |
| 5,692,166 * | 11/1997 | Milhizer et al. ............... 395/551 |
| 5,706,485 * | 1/1998 | Barkatullah et al. ............ 395/552 |
| 5,805,872 * | 9/1998 | Bannon ....................... 395/559 |
| 5,805,912 * | 9/1998 | Johnson et al. ............... 385/800.4 |

SOURCE SYNCHRONOUS INTERFACE BETWEEN MASTER AND SLAVE USING A DESKEW LATCH

FIELD OF THE INVENTION

The present invention relates to the field of computer architecture; more particularly, the present invention relates to interface between a master device and multiple slave devices.

BACKGROUND OF THE INVENTION

In prior processor-cache configurations, the cache memory receives the same clock signal as the processor. Timings between the processor and cache were standard synchronous relationships. The timing relationships are described by the following equations.

Maximum delay time must be considered when determining the clock period for a circuit. The clock period is given by the following equation:

$$t_p \geq t_{cd(max)} + t_{ft(max)} + t_{su} + t_{cksk}$$

where $t_p$ represents the clock period, $t_{cd(max)}$ represents the maximum clock to signal delay time, $t_{ft(max)}$ represents the maximum flight time for a given signal, $t_{su}$ represents the required signal set up time, and $t_{cksk}$ represents clock skew.

Hold time is determined using the following equation:

$$t_{cd(min)} + t_{ft(min)} \geq t_h + t_{cksk}$$

where $t_{cd(min)}$ represents the minimum clock to signal delay time, $t_{ft(min)}$ represents minimum flight time, $t_h$ represents the required hold time and $t_{cksk}$ represents clock skew.

Above a certain frequency, it is impossible to satisfy both equations because of the delay introduced by skew and the relationship between $t_{cd(min)}/t_{cd(max)}$ and $t_{su}/t_h$.

It is possible to extend the frequency of operation beyond the limit of these equations by using source synchronous signaling. In source-synchronous signaling, timing information is passed with signals to compensate for $t_{cd}$ and $t_{ft}$ terms. Maximum frequency of operation is limited by the $t_{su}/t_h$ window, the ability to control signal skews, and the ability to manage signal integrity.

In the prior art, source-synchronous signaling has been used in asynchronous system interfaces and with a lower frequency common clock. The present invention discloses another method to use source-synchronous signaling for a high speed memory interface. It is based on the assumption that memory is always a slave device accessed by a master device (i.e., the controller). By allowing the time base to track system delays, it is possible to maximize the signaling rate with minimal latency impact. For purposes of description, the controller is assumed to be in a CPU controlling a cache memory; however, it may also be used in any other master/slave interface. Because the delay accumulates around the loop from CPU to cache and back to CPU, the CPU must wait for maximum loop delay time (rounded to the next clock) and a deskew latch must hold data to account for the minimum loop delay time.

SUMMARY OF THE INVENTION

A source synchronous interface between a master device and slave device is described. A master device having a plurality of deskew latches is coupled to a slave device via a bus. The master device communicates commands and first timing information to the slave device via the bus. In response, the slave device communicates data and second timing information to the master device via the bus. When data is communicated from the slave device to the master device, the data is stored in one of the plurality of deskew latches until accessed by the master device.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A source synchronous interface between a master device having a plurality of deskew latches and a slave device is described. In the following description, numerous details are set forth, such as number of latches, control circuitry, etc. It will be apparent, however, to one skilled in the art, that the present invention may be practiced without these specific details. In other instances, well-known structures and devices are shown in block diagram form, rather than in detail, in order to avoid obscuring the present invention.

When a processor is connected to a cache memory via a dedicated bus, the processor operates as the master device and the cache memory operates as the slave device. The present invention will be described in terms of a processor-cache architecture; however, the present invention is equally applicable to other single master/multiple slave configurations.

As noted above, prior processor and cache memory configurations typically operate from a common clock signal. Thus, data returned from the cache memory must be returned to the processor and be stable during a known processor clock cycle window. However, using the method and apparatus disclosed herein, data returned from a cache memory can be returned within a window that crosses processor clock cycle boundaries. To do this, commands are sent to the cache memory from the processor along with timing information, such as a clock signal or a strobe. The cache memory uses the timing information to generate an internal clock signal to execute the commands sent from the processor. These commands are executed without a tightly specified relation to the processor clock. Data returned from the cache memory to the processor is returned with timing information, such as a clock or a strobe signal, and the data is latched into deskew latches. The data is stored in the deskew latches until accessed by the processor core.

Figure 1:
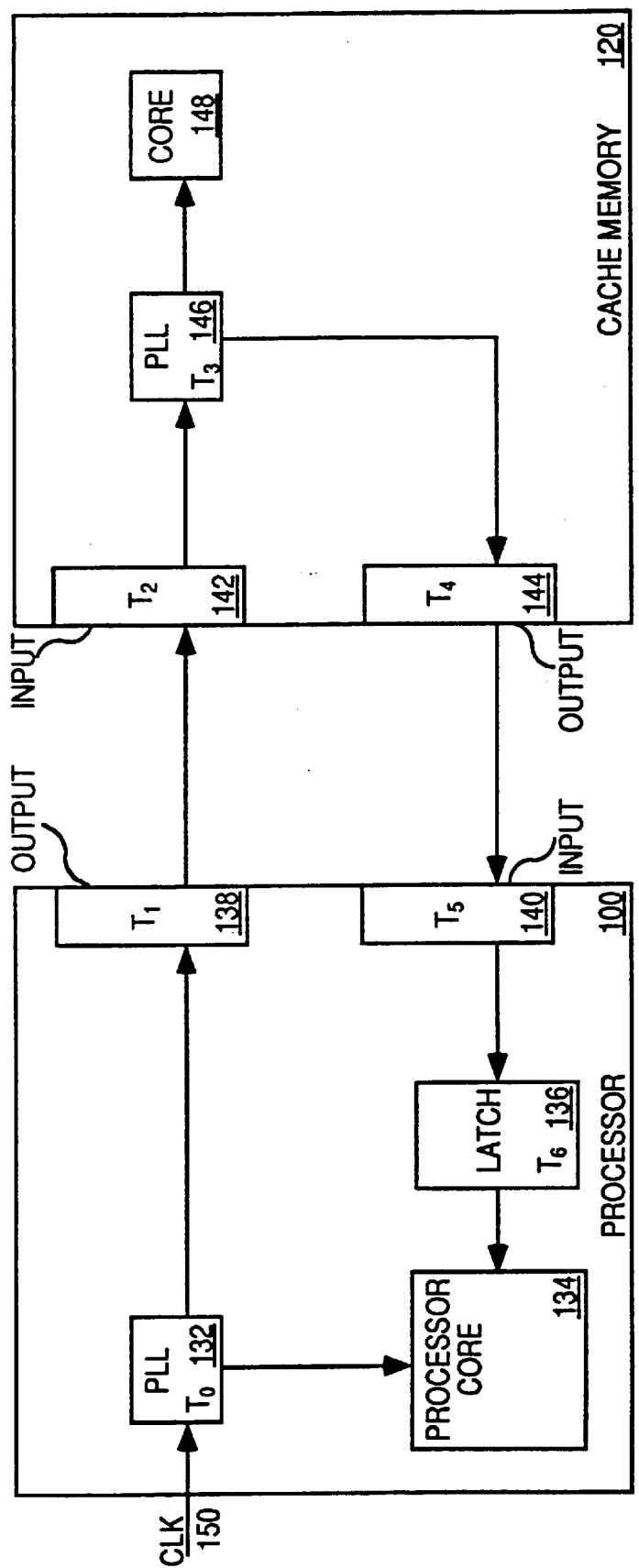
FIG. 1 is a block diagram of a processor and cache memory showing multiple clock skews.

FIG. 1 is a processor and cache memory configuration. Processor 100 receives clock signal 150. Phase locked loop (PLL) 132 generates a clock signal for processor 100 from clock signal 150. The clock signal generated by PLL 132 is labeled $T_0$. As the processor clock signal travels to output circuitry 138, the processor clock signal is delayed, or skewed. Thus, the clock signal at output circuitry 138 is a delayed version of $T_0$ and is labeled $T_1$. Similarly, as clock signal $T_1$ travels from output circuitry 138 in processor 100 to input circuitry 142 in cache memory 120, a flight time delay is introduced. The clock signal at input circuitry 142 is labeled $T_2$ and is a delayed version of clock signal $T_1$.

The clock signal internal to cache memory 120 may be generated by PLL 148 and is labeled $T_3$, which is a skewed $T_2$. It should be noted that PLL 148 is optional and may provide positive skew in the sense that $T_3$ may lead $T_2$. Clock signal $T_4$ is the clock signal at output circuitry 144 and clock signal $T_5$ is the clock signal at input circuitry 140. Timing signal $T_6$ represents the timing signal based on the data returned to processor 100 by cache memory 120.

By using the interface described herein, time domains may be "shifted" by designing a master device (e.g., processor) based on worst case considerations and a set of deskew latches based on best case considerations to store data until it is accessed by the master. Deskew latches allow a processor to access data returned from cache memory at times that are not defined by clock period and hold time equations discussed above.

Figure 2:
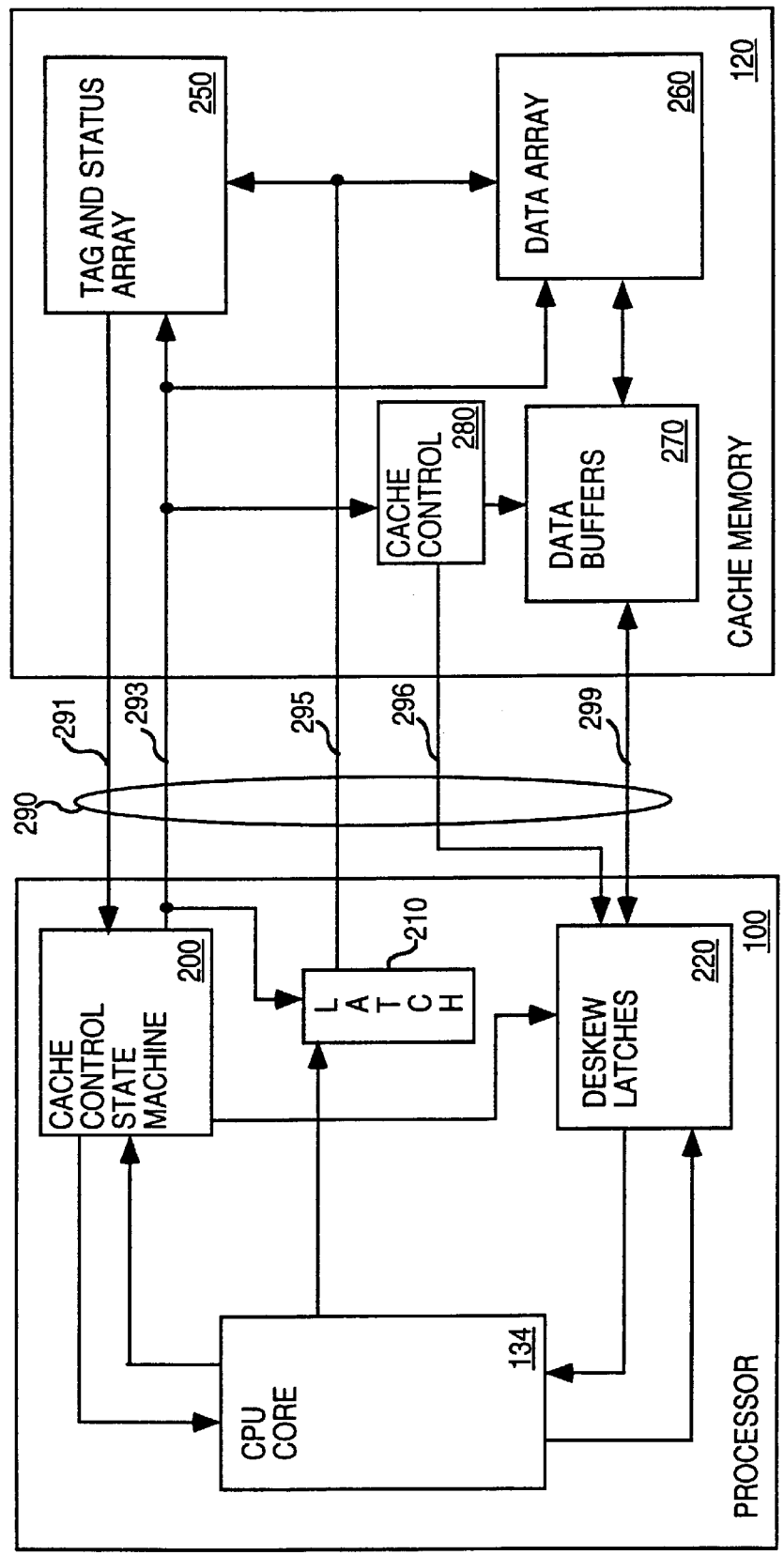
FIG. 2 is a block diagram of cache memory and a processor having deskew latches according to one embodiment of the present invention.

FIG. 2 is a block diagram of processor 100 and cache memory 120 according to one embodiment of the present invention. Processor 100 and cache memory 120 may reside in a common integrated circuit (IC) package, such as a Pentium® Processor available from Intel Corporation of Santa Clara, Calif. Alternatively, processor 100 and cache memory 120 may reside in separate IC packages.

Processor 100 generally includes processor CPU core 134, cache control state machine 200, latch 210, and deskew latches 220. Interactions between cache control state machine 200, latch 210 and deskew latches 220 with processor CPU core 134 are fully synchronous.

Cache control state machine 200 communicates with CPU core 134 to generate access control signals that are sent to tag and status array 250 and data array 260 in cache memory 120 over lines 293. Access control signals are also sent to latch 210. Cache control state machine 200 receives state and tag match data from tag and status array 250 over lines 291.

Cache control state machine 200 generates burst control data that is communicated to deskew latches 220 and data buffers 270 in cache memory 120 via cache control 280. Burst control signals are used to control the flow of data between data buffers 270 and deskew latches 220. Data is communicated between data buffers 270 and deskew latches 220 over lines 299 in chunks. According to one embodiment, a chunk of data corresponds to the width of the bus between processor 100 and cache memory 120. However, a chunk of data may be any amount of data based on cache line size, bus width, etc.

Latch 210 receives address information and commands from CPU core 134 and communicates them to data array 260 and tag and status array 250 over lines 295. Lines 291, 293, 295, 296 and 299, discussed above, comprise a backside bus 290 for communicating between processor 100 and cache memory 120.

Cache control 280 receives timing information from cache control state machine 200 and generates timing information that is communicated to processor 100 along with the data retrieved by cache memory 120. The timing information generated by cache control 280 is communicated to deskew latches 220 via line 296. The timing information may be either a clock signal or a strobe signal or the timing information may be associated with the transfer of data.

Accesses to cache memory 120 by processor 100 can be considered as involving "loops". The outer loop comprises access to the arrays of cache memory 120. The array access forms a loop in the sense that requests originate with CPU core 134 and proceed through cache control state machine 200 to tag and status array 250 and data array 260 in cache memory 120. Data from data array 260 is sent to data buffers 270, then to deskew latches 220 in processor 100. CPU core 134 accesses data from deskew latches 220 to complete the loop. Outer loop operations include tag and state read operations, data array read operations, tag updates and data array updates.

The phrase "inner loop" is used to describe a transfer of signals within the processor-cache architecture. For example, one inner loop provides burst transfers from data buffers 270 to deskew latches 220 controlled by CPU core 134 and cache control state machine 200. Data from data buffers 270 are selected and sent to deskew latches 220. The data stored in deskew latches 220 are then accessed by CPU core 134. Thus, the inner loop utilizes a subset of the circuits utilized by the outer loop.

Inner loop operations also include chunk write and chunk read operations. A one way transfer of commands from the processor to cache memory or a one way transfer of data from cache memory to the processor may also be considered an inner loop operation.

Figure 3:
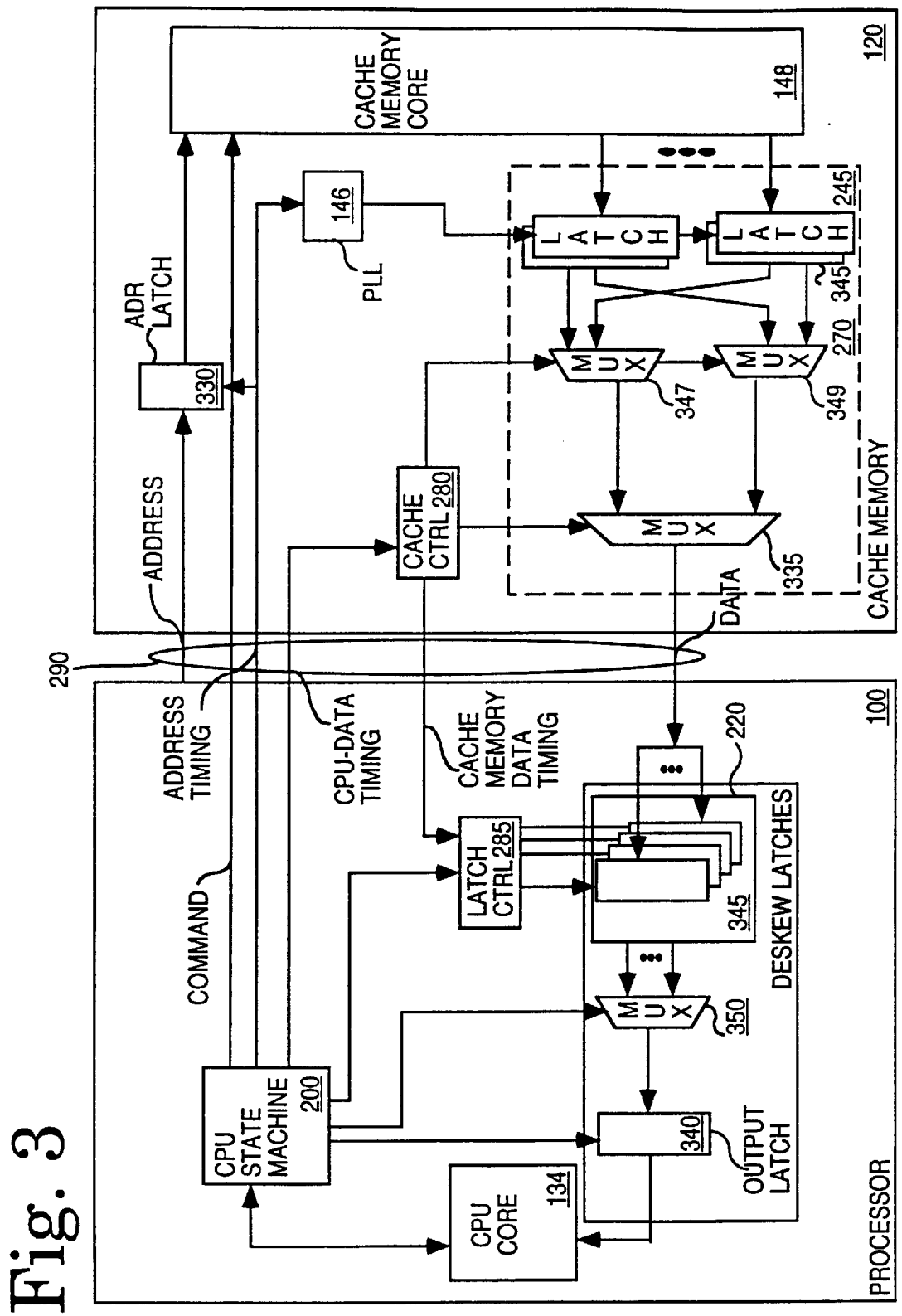
FIG. 3 is a diagram of cache memory and a processor having deskew latches according to one embodiment of the present invention.

FIG. 3 is a diagram of a processor and cache memory configuration according to one embodiment of the present invention. As discussed above, in an outer loop operation, CPU core 134 and cache control state machine 200 generate commands, addresses and timing information that are communicated to cache memory 120. The addresses are latched by address latch 330 in cache memory 120. Address latch 330 is controlled by address timing information, which is also input to PLL 146. The commands generated by cache control state machine 200 are also communicated to cache memory core 148, which includes tag and status array 250 and data array 260 of FIG. 2 (not shown). Timing information from cache control state machine 200 is also input to cache control 280, which controls multiplexers 335, 347 and 349. The implementation described by FIG. 3 is one of many possible implementations of the present invention.

Once requested data is retrieved by cache memory core 148, the data is sent to latches 345. Latches 345 hold chunks of the cache line retrieved. The chunk to be selected and sent to processor 100 is selected by multiplexers 335, 347 and 349.

When data is sent from cache memory 120 to processor 100, timing information is sent from cache control 280 to latch control 285 in processor 100. Latch control 285 also receives input from cache control state machine 200. Latch control 285 controls deskew latches 220 such that the chunks of data output from multiplexer 335 are input to the appropriate deskew latch. The output of each deskew latch is coupled to an input of multiplexer 350, which is controlled by cache control state machine 200. The output of multiplexer 350 is input to output latch 340, which stores the chunk of data until CPU core 134 requests a new chunk of data.

For an inner loop operation, commands and timing information are generated by cache control state machine 200 and CPU core 134 and sent to cache memory 120. In response, cache control 280 selects the requested chunk from latches 345 to output the requested chunk to deskew latches 220 in processor 100. Cache control 280 also generates timing information that is sent to latch control 285.

The data sent from cache memory 120 is received by deskew latches 220. Latch control 285 and cache control state machine 200 select the proper deskew latch via multiplexer 350 to output the requested chunk to output latch 340. CPU core 134 then accesses the chunk from output latch 340.

Figure 4:
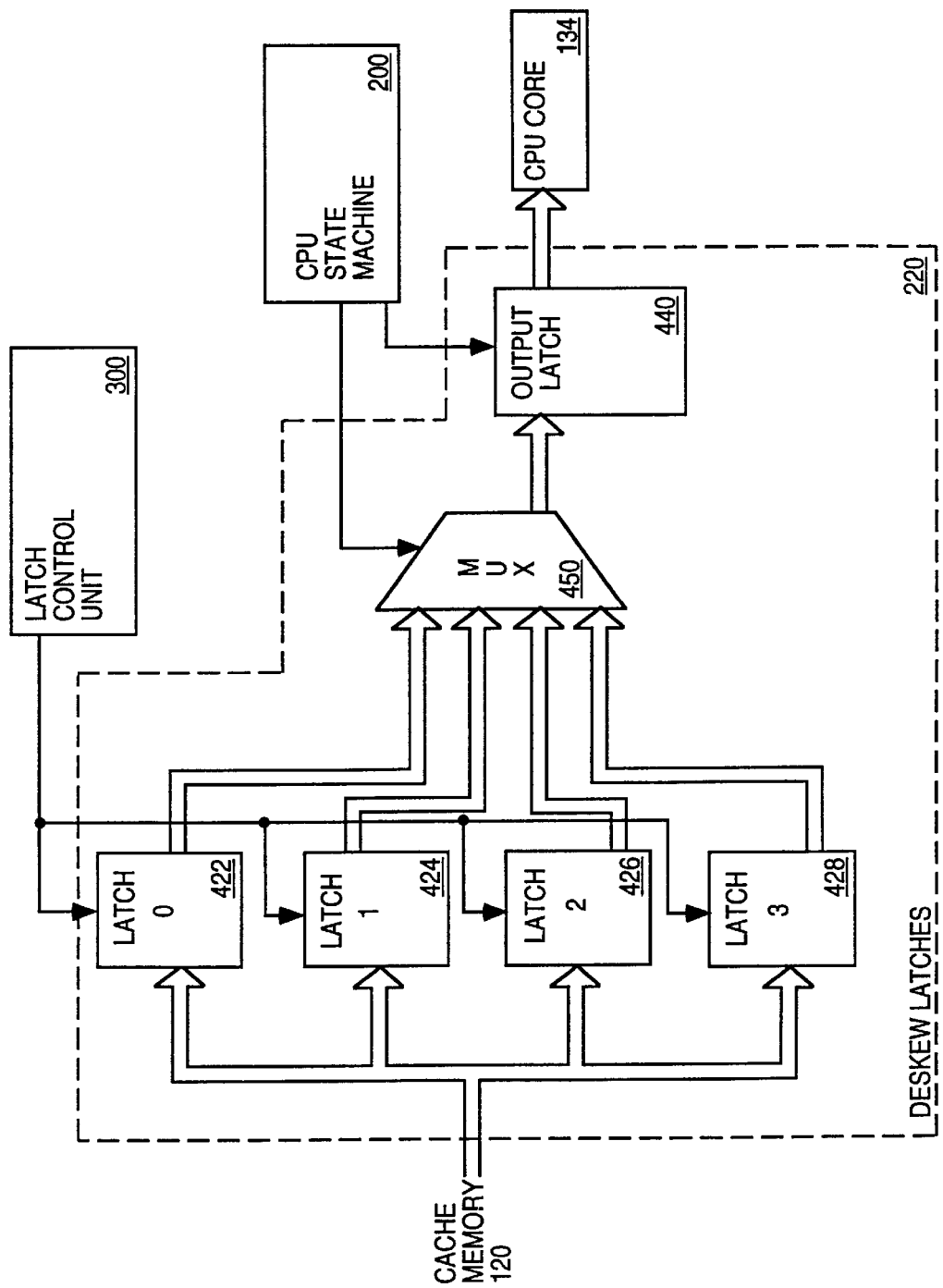
FIG. 4 is a block diagram of a deskew latch implementation according to one embodiment of the present invention.

FIG. 4 is a block diagram of four deskew latches according to one embodiment of the present invention. Each deskew latch stores a chunk of data. Data from cache memory 120 is input to deskew latches 220, which comprises four latches 422, 424, 426, and 428. The latch control unit 300 selects the appropriate latch to receive data from cache memory 120. According to one embodiment, four deskew latches are implemented; however, any number of deskew latches may be implemented (e.g., one, two, three, etc.). The number of deskew latches is chosen to match the worst case skew of the outer loop. The deskew latches ensure that the master device will always read valid data for the full range of skew of the first and second timing information.

According to one embodiment, data is received by the deskew latches 220 in a circular manner. For example, a first chunk of data stored in latch 422, a second chunk in latch 424, a third chunk in latch 426, and a fourth chunk in latch 428. The four chunks, each of which is stored in one latch, comprise a word of data that is retrieved from cache memory 120. The next chunk of data received is stored in latch 422.

The outputs of latches 422, 424, 426, and 428 are coupled to the inputs of multiplexer 450 which is controlled by cache control state machine 200. The output of multiplexer 450 is the input to output latch 440 which is coupled to CPU core 134.

Figure 5:
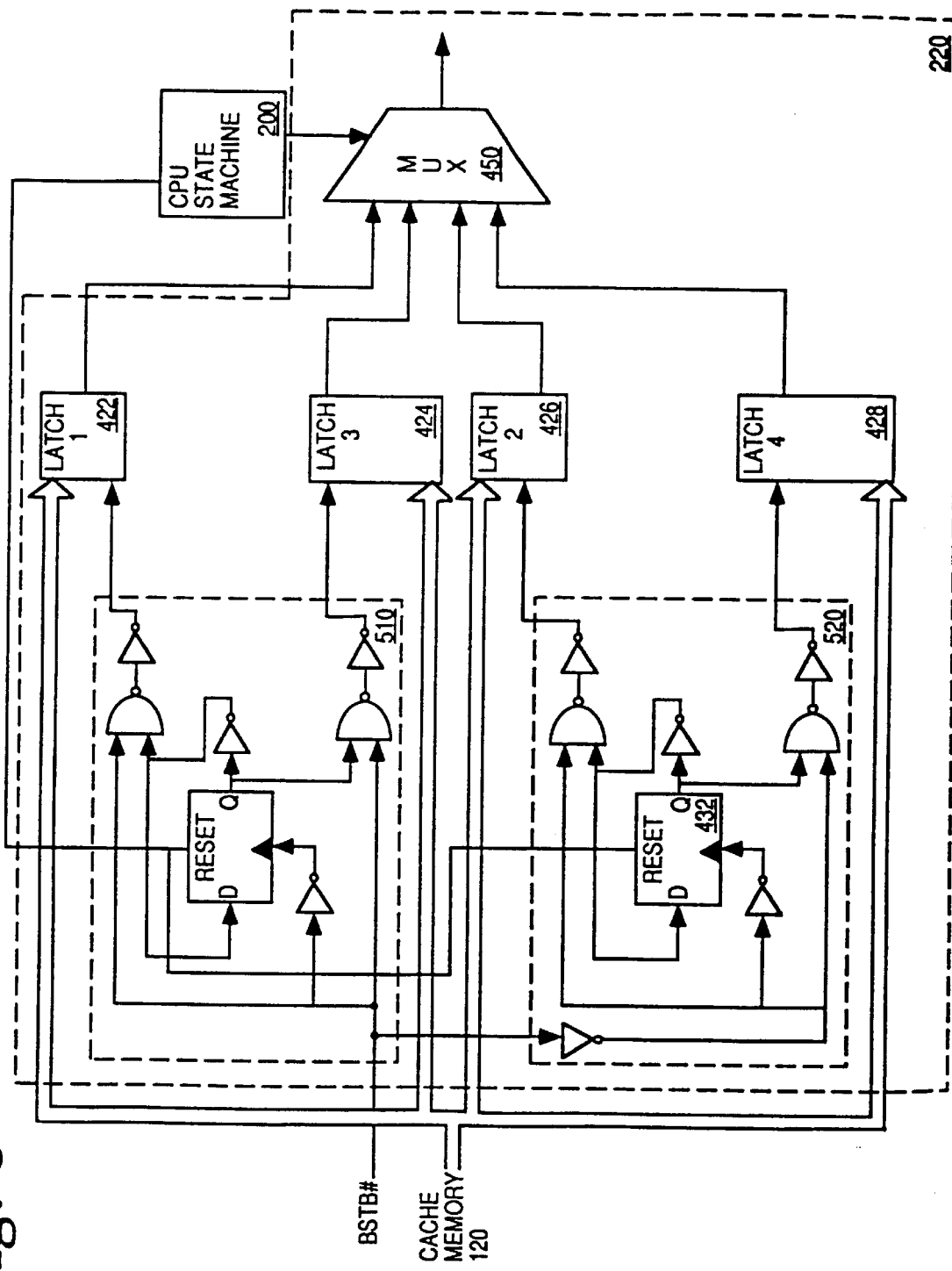
FIG. 5 is a circuit level diagram of the deskew latches according to one embodiment of the present invention.

FIG. 5 is a circuit level diagram of deskew latches 220 according to one embodiment of the present invention. According to one embodiment, deskew latch control circuitry 510 and 520 receive as inputs BSTB#, which is a strobe signal. Deskew latch control circuitry 510 and 520 comprise standard logic elements well known in the art as shown in FIG. 5. The implementation shown in FIG. 5 stores the first chunk of data retrieved in latch 422, the second chunk in latch 426, and so on, in a circular manner as discussed above.

In order to reduce skew introduced by the strobe signals, a pair of complementary strobe signals (e.g., BSTB and BSTB#) may be used to control the deskew latches. Alternatively, the deskew latches may be controlled by a clock signal received from cache memory 120.

The outputs of latches 422, 426, 424, and 428 are coupled to multiplexor 450. The output of multiplexor 450 is accessed by CPU core 134 (not shown) either directly or via output latch 440, as shown in FIG. 4.

Because the latching action of deskew latches 220 is controlled in response to a strobe signal generated by cache memory 120, the times at which data is latched by the latches is independent of the clock driving processor 100 (e.g., $T_0$). Thus, the window in which the data may be latched may cross processor 120 clock cycle boundaries. Data stored in the deskew latches flows through the latches so that the data is available before the data is latched in response to the BSTB# signal. Access to the data stored in the deskew latches may be made independent of the BSTB# signal. Alternatively, clocked latches may also be used.

Figure 6:
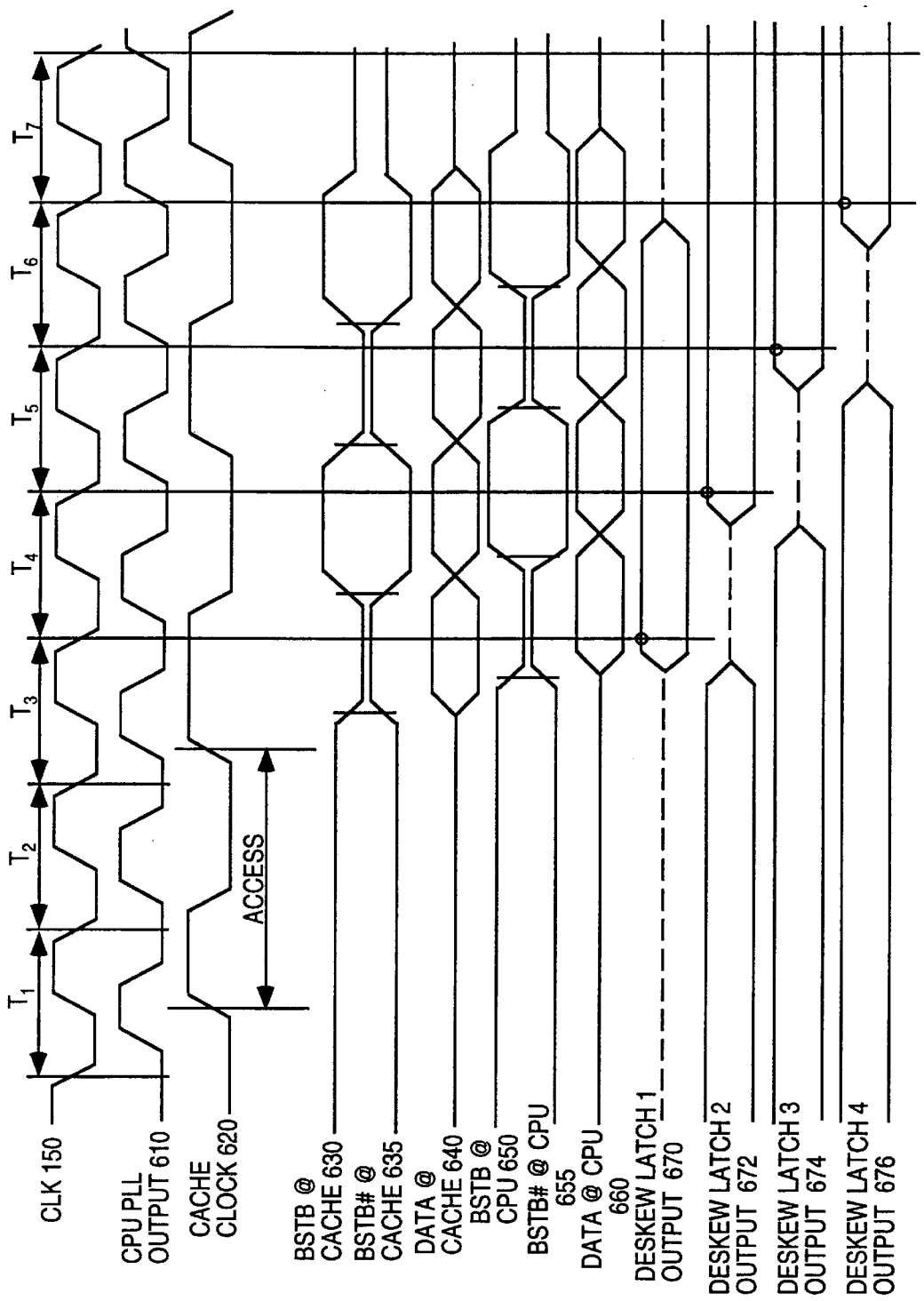
FIG. 6 is a timing diagram of a cache access according to one embodiment of the present invention.

FIG. 6 is a timing diagram of a plurality of signals in the master-slave interface according to one embodiment of the present invention. CLK signal 150 corresponds to CLK signal 150 of FIG. 1. CPU PLL signal 610 is the clock signal that drives processor 100 and is used in the timing of accesses to data returned by cache memory 120. CPU PLL output signal 610 corresponds to the $T_0$ time base of FIG. 1.

Cache clock signal 620 corresponds to the $T_3$ time base of FIG. 1 and is the clock signal that drives cache memory 120. Cache clock signal 620 is used in executing commands received from processor 100 and in sending data and timing information to processor 100.

Some of the signals described below are described as uni-directional signals. These signals may also be designed as bi-directional signals that are actively driven for a fixed number of clocks and then instead of being left to float are held at the last value through the use of weak drivers called "keepers". The keepers maintain the signals within the limits of logical high or low values. Keepers help to reduce power consumption in the receiver compared to an implementation where the signals float.

BSTB@cache signal 630 and BSTB#@cache signal 635 form a complementary pair of strobe signals that are sent from cache memory 120 to processor 100. These signals correspond to the $T_4$ time base in FIG. 1. These strobe signals are the timing information sent from cache memory 120 to processor 100 along with the data that is requested by processor 100.

Data@cache signals 640 are the data sent from cache memory 120 to processor 100. These signals also correspond to the $T_4$ time base. As can be seen from FIG. 6, the transition of the strobe signals occurs after the data signals are set up.

BSTB@CPU signal 650 and BSTB#@CPU signal 655 are the strobe signals generated by cache memory 120 at the time they arrive at processor 100. These signals are delayed with respect to the strobe signals at cache memory 120 because of flight time delays between cache memory 120 and processor 100. The strobe signals at processor 100 correspond to the $T_5$ time base of FIG. 1.

Data@CPU signals 660 are the data as it arrives at processor 100. Again, these signals are delayed by the flight time between cache memory 120 and processor 100. Data@CPU signals 660 corresponds to the $T_5$ time base of FIG. 1.

Deskew latch 1 output 670, deskew latch 2 output 672, deskew latch 3 output 674, and deskew latch 4 output 676 are the output signals of the respective deskew latches. These signals correspond to the $T_6$ time base of FIG. 1. These output signals are the respective chunks of data that are received from cache memory 120. The $T_6$ time base is based on data rather than clock and strobe signals that form the basis of the other time bases. Alternatively, the $T_6$ time base may be based on a clock or strobe signal if the data at the deskew latches is latched in response to a timing signal before it is available to processor core 134. However, this embodiment would incur somewhat of a performance penalty.

Thus, source synchronous interface between master and multiple slaves using a deskew latch has been described.

What is claimed is:

1. A system, comprising:
   a slave device;
   a master device having a plurality of deskew latches; and
   a bus coupled between the slave device and the master device, wherein the bus communicates a request from the master device to the slave device and communicates data and timing information from the slave device to the master device in response to the request;

wherein the slave device operates, asynchronously with respect to the master device, in response to the request to generate the timing information and the data, and further wherein the data is stored in one of the plurality of deskew latches until the data is accessed by the master device.

2. The system of claim 1, wherein the timing information comprises a clock signal.

3. The system of claim 1, wherein the timing information comprises a strobe signal.

4. The system of claim 1, wherein the data is latched into one of the plurality of deskew latches in response to the timing information.

5. The system of claim 1, wherein the master device is a processor.

6. The system of claim 1, wherein the slave device is a cache memory.

7. A method comprising:
   issuing a request from a processor to a cache memory;
   executing the request in the cache memory asynchronously with respect to clock cycles in the processor;
   retrieving data requested by a command;
   generating timing information;
   sending the data and the timing information from the cache memory to the processor; and
   latching, in a deskew latch, the data in response to the timing information.

8. An integrated circuit (IC) package, comprising;
   a cache memory subsystem;
   a processor having a plurality of deskew latches; and
   a bus coupled between the cache memory subsystem and the processor, wherein the bus communicates a command from the processor to the cache memory subsystem and the bus further communicates timing information and data accessed in response to the command from the cache memory subsystem to the processor and a bus interface is configured to provide access by the processor to one or more peripheral device;

wherein the cache memory subsystem operates asynchronously with respect to a system clock in response to the command to output the data and the timing information, and further wherein the data is latched in the deskew latches in response to the timing information.

9. The IC package of claim 8, wherein the timing information comprises a strobe signal.

10. The IC package of claim 8, wherein the timing information comprises a clock signal.

11. An apparatus comprising:
    means for issuing a request from a processor to a cache memory;
    means for executing the request in the cache memory asynchronously with respect to clock cycles in the processor;
    means for retrieving data requested by a command;
    means for generating timing information;
    means for sending the data and the timing information from the cache memory to the processor; and
    means for latching the data in response to the timing information.

* * * * *

UNITED STATES PATENT AND TRADEMARK OFFICE
CERTIFICATE OF CORRECTION

PATENT NO. : 6,209,072 B1
DATED : March 27, 2001
INVENTOR(S) : Mac Williams et al.

It is certified that error appears in the above-identified patent and that said Letters Patent is hereby corrected as shown below:

<u>Title page,</u>
Item [75] Inventor name, delete "Manoji" and insert -- Manoj --.

Signed and Sealed this

Twenty-fifth Day of September, 2001

Attest:

*Attesting Officer*

NICHOLAS P. GODICI
*Acting Director of the United States Patent and Trademark Office*